Figure 1:
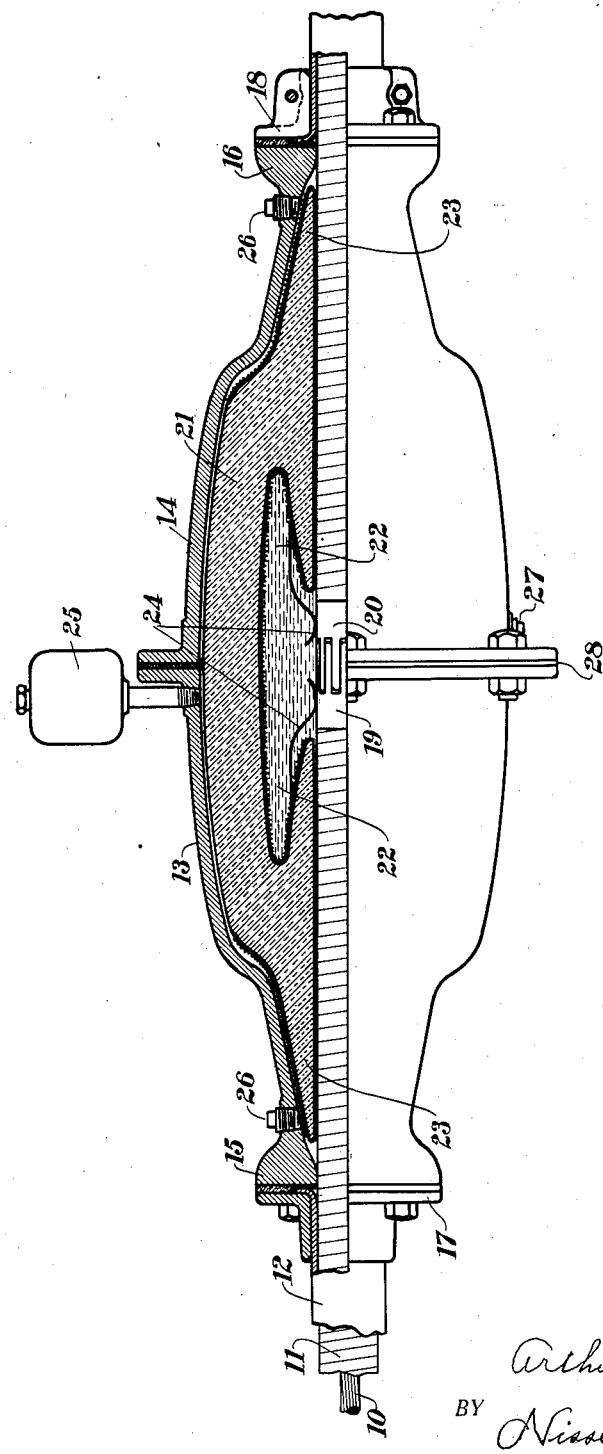

April 29, 1930.  A. O. AUSTIN  1,756,080
INSULATED CABLE JOINT
Filed June 1, 1926

INVENTOR.
Arthur O. Austin
BY Nissen & Crane
ATTORNEYS

Patented Apr. 29, 1930

1,756,080

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

INSULATED CABLE JOINT

Application filed June 1, 1926. Serial No. 112,747.

This invention relates to joints for uniting the ends of insulated conductor cables and has for its object the provision of an improved joint which will eliminate the personal element to a large extent, in the formation of the joint and provide a reliable connection which may be easily made up and which will be free from defects usually causing cables to fail at the joint. The joint is applicable to any cable having an internal conducting member and a layer of insulation and an outer metal sheath or jacket.

The invention is exemplified in the combination and arrangement of parts shown in the accompanying drawings and described in the following specification and it is more particularly pointed out in the appended claims.

In the drawings—

The figure is an elevation partly in section showing one embodiment of the present invention.

Making up satisfactory joints for high voltage cables which will be reliable is expensive and difficult to carry out. Most high voltage cables are wound in many layers of paper, or varnished cambric and it is difficult to make a splice which will develop a dielectric strength which will approximate that of the cable. Where wrapped joints are made up, much care has to be taken so that air pockets, moisture or other dirt does not get into the joint which will cause the joint to break down later.

As cables work under very high electrical stress, much care has to be taken otherwise charging current flowing along the surface or in the layers will start carbonization and break down the cable. If a discharge can be started, either at normal voltage or due to an abnormal voltage on the cable, the cable or joint may be readily broken down at comparatively low voltage, particularly if there is a high frequency disturbance present.

The figure shows one form of the joint which may be made for practically any voltage by properly proportioning the parts. The cable is composed of a conductor 10, a layer of insulation 11 and a sheath 12 which is usually of lead. The joint may be made up in a large number of different ways and still come within the scope of the invention. In practical form it consists of two metal bells 13 and 14 with flanged ends 15 and 16. The metallic sheath 12 covering the cable is attached to the bells 13 and 14 by flanges 17 and 18. The conductors in the two pieces of cable which it is desired to splice terminate in complementary metallic members 19 and 20. Insulation for the conducting members 19 and 20 is provided by the insulating sleeve 21, preferably of porcelain or similar solid dielectric material, which has screening grooves or pockets 22 and tapered end sections 23 for preventing discharge along the space between the inner surface of said sleeve and the outer surface of the insulating covering of said conductor. The entire surface of the pocket is coated with conducting material and is in electrical contact with the members 19 and 20. This contact is made by a spring 24 or other suitable means. The pocket 22 may be filled with an insulating compound or be allowed to fill with oil or compound from the cable. It is generally preferable, however, to fill the pocket with some material so that air will not work out of the pocket and along the cable, although the latter will do no particular harm where the joint is of sufficient size. Where the screening surfaces of the pockets 22 are sufficiently large the full voltage carrying strength of the cable may be developed, even though the space between the insulating member 21 and the cable is not filled with oil or insulating compound, thus giving the joint a high degree of reliability and making insulation particularly easy as it is usually very difficult to get all the air out of a joint.

The bells may be equipped with an expansion chamber 25, and openings at 26 and 27. The expansion chamber may be filled with oil or any suitable insulating compound. This expansion chamber may be of any suitable type and simply fill the joint by gravity or may be under pressure due to the location of the reservoir or due to air pressure placed on the top of the compound in the reservoir. In some cases the bellows or accordion type of reservoir may be used to advantage which will permit the expansion and contraction without the admission of air.

Where insulated cables having hollow conductors are used, oil or compound may flow up through the openings in the joint between end fittings 19 and 20 by leaving out the plugs 26. The flow of oil or compound will tend to clean out any air in the space between the insulation on the cable and the adjacent inner surface of the member 21.

In order to install the cable, the collar of flange 17 is slipped over the lead sheath. The lead sheath is then removed the required distance so that when the conductor 10 is sweated into the fitting 19 sufficient lead will be left so that it can be flared out and clamped between the flange 17 and the end 15 of the bell 13. The end of the lead sheath is next flared out over the face of the flange 17 so that it will make a tight joint when clamped against the face of the flange 15. The terminal fitting 19 is then sweated or attached to the end of the conductor in the cable, sufficient insulation being removed to permit of the attachment.

The same method is followed for the cable which will be joined to the first member. If desired, a split flange or collar 18 may be used in place of the continuous collar or flange 17. This permits gripping the cable very securely and is preferable in some cases. One of the bells 13 may then be attached to the end of the cable and insulating baffle or member 21 shoved over the cable. The other end of the cable with bell attached may then be drawn up in place, the cable with terminal 19 being shoved into the opening provided in the insulating sleeve 21. If the cables are of proper length between flanges, the complementary terminal fittings 19 and 20 will mesh and make electrical contact when the flanges 16 are tightened together. A gasket 28 is placed between the two flanges to insure a tight joint. It is evident that the bell members may be placed over the insulated joint and the cables thrust in from the end or, in fact, any other method used where space and working conditions permit. The insulating member 21 may simply rest loosely in the bells or it may be held in position by any suitable cushioning material. In general, this member will be held in position by the cable at each end. The clearance between insulating member 21 and the bells 13 and 14 may be very small or large as desired. Where there is considerable space between the two it is necessary to metallize the outer surface of the ends 23 and in some cases to metallize the entire outer surface. This metal covering diverts charging currents from flowing along the surface of the wrapping 11. If desired, an additional wrapping or layer of insulating material may be placed outside of the insulating member 21 or additional insulating sleeves to further reinforce the joint.

I claim:—

1. A joint for a conductor comprising means for forming electrical connection between adjacent ends of the conductor, and a sleeve of dielectric material surrounding said connecting means, said sleeve having a flux control member of conducting material electrically connected with said connecting means and extending outwardly into the body of said sleeve and longitudinally of said conductor away from said connecting means beyond the outermost point of electrical connection between said control member and said conductor.

2. A joint for a conductor having an insulating covering comprising means for electrically connecting adjacent ends of said conductor, a sleeve of dielectric material surrounding the connected ends of said conductor and extending longitudinally of said conductor in opposite directions from said connected ends and overlying the insulation of said conductor, and a flux screen of conducting material electrically connected with said conductor and extending into the body of said sleeve adjacent the connecting means for said conductor and overlying the insulation of said conductor but separated from the surface of said insulation by the material of said dielectric sleeve for directing electrostatic flux through the material of said dielectric sleeve and preventing discharge between the inner surface of said sleeve and the outer surface of the insulating covering of said conductor.

3. A joint for a conductor having an insulating covering comprising means for electrically connecting adjacent ends of said conductor, a porcelain sleeve surrounding the connected ends of said conductor and extending longitudinally of said conductor along the insulating covering thereof, said sleeve having a radially projecting pocket therein registering with the joint in said conductor, and conducting material electrically connected with the joint in said conductor and disposed in said pocket.

4. A joint for a conductor having an insulating covering and an outer metal sheath, adjacent ends of said conductor being electrically connected and a portion of the sheath being removed from the connected ends, a unitary sleeve of porcelain surrounding the insulating covering of said conductor where the sheath is removed therefrom, said sleeve having a flux control extending into the material thereof from a point adjacent the connected ends of said conductors and connected with said conductor, and housing members connected with the terminals of said sheath and gradually flared outwardly away from said conductor along the outer surface of the ends of said sleeve and enclosing said sleeve.

5. A joint for a conductor having an insulating covering and an outer metal sheath.

there being a break in said insulating covering exposing said conductor at said joint, said sheath being removed from said covering for a short distance at each side of said break, a sleeve of dielectric material surrounding the break in said insulating covering and extending along said insulating covering in opposite directions from said break, and a flux control connected with said conductor at the break in said insulating covering and extending into said sleeve and having portions in said sleeve projecting longitudinally of said conductor beyond the break in said covering.

6. A joint for a conductor having a dielectric covering and an outer metal sheath, said dielectric covering having a break therein at said joint and having a portion thereof free of said sheath at opposite sides of said joint, a unitary porcelain sleeve surrounding said joint and extending longitudinally of said conductor along the outer surface of said insulating covering, said sleeve having a pocket therein opening through the inner wall of said sleeve and flared outwardly into the material of said sleeve from said opening, said pocket having conducting material disposed therein and connected with the joint in said conductor to form a flux control to prevent discharge from the exposed joint of said conductor along the outer surface of said insulating covering, the opposite ends of said sleeve being gradually tapered inwardly, and housing members connected with said sheath and gradually flared outwardly to enclose the tapered ends of said sleeve, the adjacent ends of said housing members being detachably connected together.

7. A joint for a conductor having a dielectric covering and an outer metal sheath comprising means for electrically connecting the adjacent ends of said conductor, said sheath being terminated at points spaced from said ends, gradually flared bells of conducting material having their smaller ends electrically connected with said sheath at the terminations thereof, a unitary porcelain sleeve having tapered ends arranged to project into the flared openings at the ends of said bells, means for securing the larger ends of said bells together centrally of said sleeve, and a flux control member extending into said sleeve from the central portion of the inner wall thereof and flared in opposite directions longitudinally of said conductor within the body of said sleeve.

8. A joint for a conductor having an insulating covering and an outer metal sheath comprising a housing having opposite tapered ends, said sheath being terminated at the ends of said housing and connected thereto while said insulating covering extends into said housing, a sleeve of dielectric material having a higher specific inductive capacity than said insulating covering surrounding said conductor within said housing and having tapered ends extending to positions adjacent the opposite ends of said housing, a flux control member connected with said conductor at the joint formed therein, said control member comprising an outwardly flared pocket formed in said dielectric sleeve and opening through the inner wall thereof, the inner surface of said pocket being coated with conducting material, said housing being centrally divided to permit assembly of said parts, and means for supplying insulating fluid to the interior of said housing.

9. Means for connecting adjacent ends of conductors having insulating coverings and metal sheaths comprising metal bells connected with said sheaths at points spaced from the ends of said conductors and flared outwardly to points opposite said ends, connecting means formed on the ends of said conductors and arranged to form electrical connections when butted together, the insulating covering of said conductors extending into said bells to points adjacent the ends of said conductors, a sleeve of dielectric material having higher specific inductive capacity than said insulating covering arranged to receive the ends of said conductor and to be received into said metal bells, said sleeve having a flux control member centrally formed therein and opening through the inner wall thereof, means for forming electrical connection between said flux control member and the ends of said conductors when said conductors are inserted into said sleeve, and means for securing the open ends of said bells together to hold the ends of said conductors and said sleeve in assembled relation.

10. The combination with a pair of cable sections each comprising a conductor, an insulating covering surrounding said conductor, and an outer metal sheath, of complementary contact members having complementary inter-engaging projections and recesses arranged to make electrical contact when moved together from opposite directions in the direction of the length of said conductor for electrically connecting the adjacent ends of said conductors, the ends of said metal sheaths being spaced from said contact members, and a preformed tubular dielectric member having a bore of sufficient size to permit the passage of said contact members therethrough and having a higher dielectric flux constant than the insulating covering for said conductor, said tubular dielectric member being fitted closely about the cable insulation between the ends of said sheath and extending continuously over the joint between said conductors and providing an imperforate wall surrounding said joint and overlapping the cable insulation between the ends of said sheaths.

11. The combination with a pair of cables each having a conductor, an insulating covering for said conductor, and an outer metal sheath of complementary members for electrically connecting adjacent ends of said conductors, the ends of said sheaths being spaced from the ends of said conductors to expose a portion of said insulating covering, and a continuous porcelain tube overlapping said complementary connecting members, the bore of said tube being large enough to permit the passage of said connecting members therethrough and the wall of said tube forming an imperforate shell surrounding said members when said members are connected and disposed next adjacent to and enclosing the exposed portion of said insulating covering.

12. The combination with a pair of cables having an insulating covering, of means for joining the adjacent ends of said cables, and a flux control member adjacent the joint between said cables, said flux control member comprising a dielectric body of material having a higher dielectric flux constant than the insulating covering for said conductor, said body having an opening therein extending away from the joint between said conductors, and conducting material within said opening.

13. The combination with a pair of cables each having a conductor, a dielectric covering and an outer metal sheath, of means for electrically connecting adjacent ends of said conductors, the ends of said sheaths being spaced from the ends of said conductors, a sleeve of solid dielectric material surrounding the joint between said conductors and the adjacent insulating covering, said sleeve having a flux control pocket therein adjacent the joint between said conductors, and a pair of housing members having tapered ends connected to the ends of said sheaths and having their larger ends disposed adjacent each other and secured together forming a casing surrounding said sleeve.

14. The combination with a conductor having a dielectric covering and an outer metal sheath, of means for protecting said dielectric covering and preventing flashover at the termination of said sheath, said means comprising a two-part housing member divided transversely and surrounding said dielectric covering and having a tight union with said sheath, the two parts of said housing being separably joined, said covering being extended intact into said housing member, a solid dielectric member separate from said covering and having a tapered portion disposed adjacent the termination of said sheath, and a covering of conducting material shaped to conform to the outer surface of said dielectric member.

In testimony whereof I have signed my name to this specification on this 27th day of May, A. D. 1926.

ARTHUR O. AUSTIN.